(12) United States Patent
Young

(10) Patent No.: US 6,319,084 B1
(45) Date of Patent: Nov. 20, 2001

(54) SOUND SIMULATING METHOD AND DEVICE

(76) Inventor: Joseph M. Young, 8993 Perry Hwy., Erie, PA (US) 16509

( * ) Notice: Subject to any disclaimer, the term of this patent is extended or adjusted under 35 U.S.C. 154(b) by 0 days.

(21) Appl. No.: 09/451,282

(22) Filed: Nov. 30, 1999

Related U.S. Application Data

(60) Provisional application No. 60/110,326, filed on Nov. 30, 1998.

(51) Int. Cl.$^7$ ............................. A63H 33/00; A63H 33/40
(52) U.S. Cl. ................................. 446/27; 446/202
(58) Field of Search ............................. 446/27, 202, 208, 446/209, 200, 203, 204, 213, 397

(56) References Cited

U.S. PATENT DOCUMENTS

| | | | |
|---|---|---|---|
| 3,439,447 | * | 4/1969 | Green ................................. 446/27 X |
| 3,883,982 | * | 5/1975 | McClary ................................. 446/27 |
| 4,050,186 | * | 9/1977 | Shults et al. ....................... 446/202 X |
| 4,400,591 | * | 8/1983 | Jennings et al. ................... 446/27 X |
| 4,683,588 | * | 7/1987 | Goldberg ........................... 446/27 X |

* cited by examiner

*Primary Examiner*—D. Neal Muir
(74) *Attorney, Agent, or Firm*—Wayne L. Lovercheck

(57) ABSTRACT

A noise cover system for preventing the noise of a cough, sneeze or the like by a hunter, bird watcher or the like from disturbing birds or animals. The cover is made of flexible thermoplastic neoprene rubber or similar material. The cover is a face mask with a central opening for receiving a face mask. The sides each have a button that can be held to the other side or have a head strap attached. The noise maker has means to make the sound of a crow or other familiar sound, is supported in an opening in the face mask and forcefully exhaled air from a sneeze or cough will actuate the noise maker.

14 Claims, 2 Drawing Sheets

SOUND SIMULATING METHOD AND DEVICE

CROSS REFERENCE TO RELATED APPLICATION

This application claims the benefit of U.S. Provisional Application Ser. No. 60/110,326 filed Nov. 30, 1998.

BACKGROUND OF THE INVENTION

This invention relates generally to outdoor equipment and more particularly to a noise making device used by hunters, animal watchers and other outdoor people who desire to watch animals or birds without startling them by coughing, sneezing or other exhaling noises.

SUMMARY OF THE INVENTION

The noise covering system has a face mask made of a thermoplastic neoprene, silicone rubber or other similar flexible material to fit over the face of a person.

An opening is provided towards the front of the face mask and a noise maker, for example a crow call, is supported over the opening so that when the wearer of the mask coughs, sneezes or exhales forcefully, the resulting wave of air is directed into the face mask. This wave of air travels through the opening and activates the noise maker and makes the sound of a crow for example, or other woodland noise that wild animals are familiar with and would not be startled by.

It is an object of the present invention to provide a noise maker device activated by an air current to imitate the voice of a wild creature. It is another object of this invention to provide a method of directing the exhalation of a person while sneezing, coughing or otherwise forcibly breathing into a noise maker, which imitates the voice of a wild creature.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
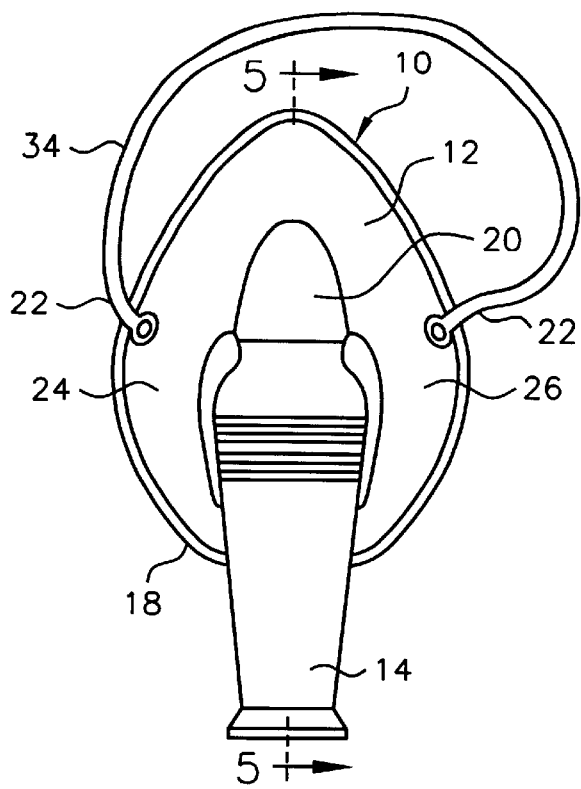
FIG. 1 is a front view of the face cover and noise maker in accordance with the invention.
Figure 2:
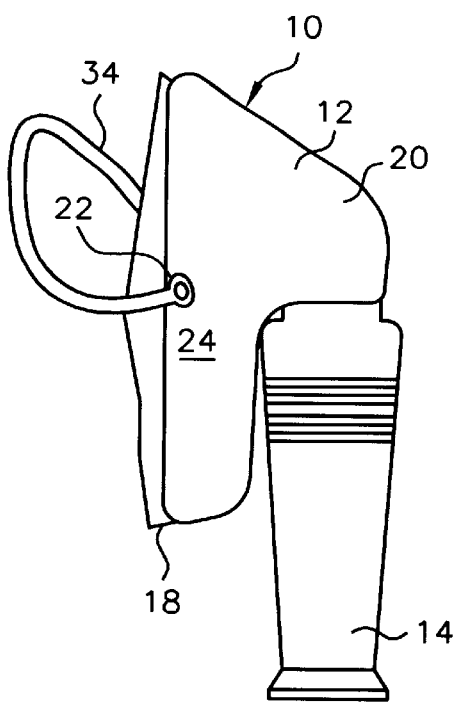
FIG. 2 is a side view of the cover shown in FIG. 1.
Figure 3:
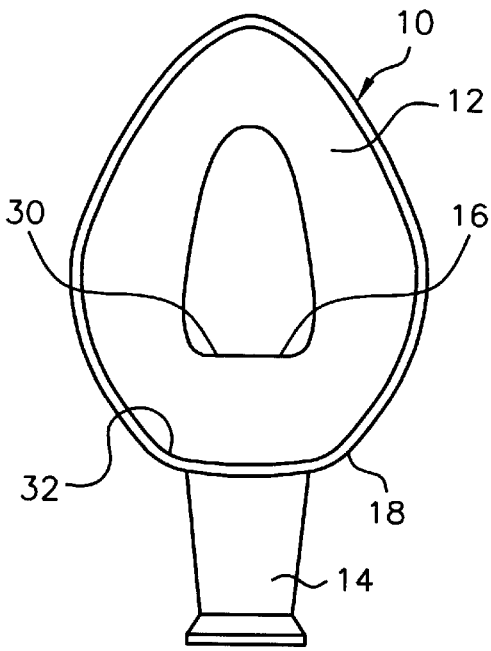
FIG. 3 is a rear view of the face cover and noise maker device.

Now with more particular reference to the drawings, shown is noise simulating system 10 made up of face mask 12 and reed type crow call 14 inserted into opening 16 located at the bottom of the inside 30 of nose piece 20. Snap attachment or other suitable fasteners can be attached to crow call 14 to hold it to face mask 12. Face mask 12 can be made of a thermoplastic such as neoprene, rubber or other suitable flexible plastic sheet or molded material.

Face mask 12 has generally round part 18 that extends over the face of the wearer. Nose piece 20 overlies the nose while lower portion 32 of round part 18 overlies mouth of the wearer. Crow call 14 or other suitable noise making device, is supported in opening 16 as an example of a noise maker that will produce a noise familiar to the forest and to the animals that live there.

Figure 4:
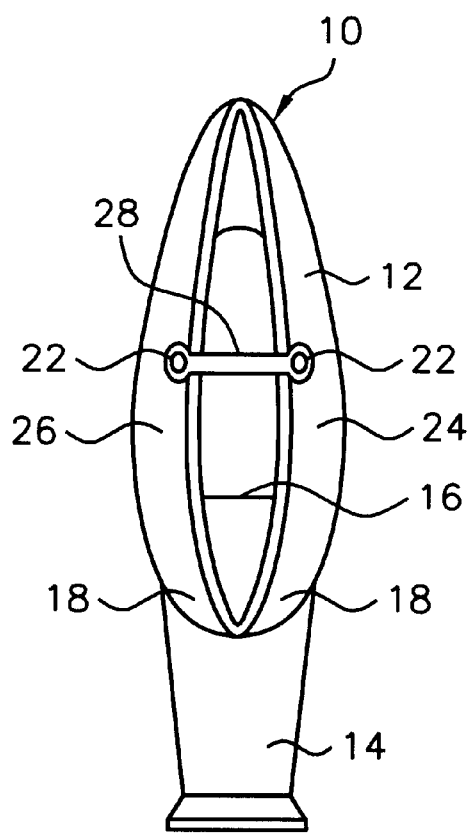
FIG. 4 is a rear view of the face cover and noise maker with the face cover in a folded or closed position.
Figure 5:
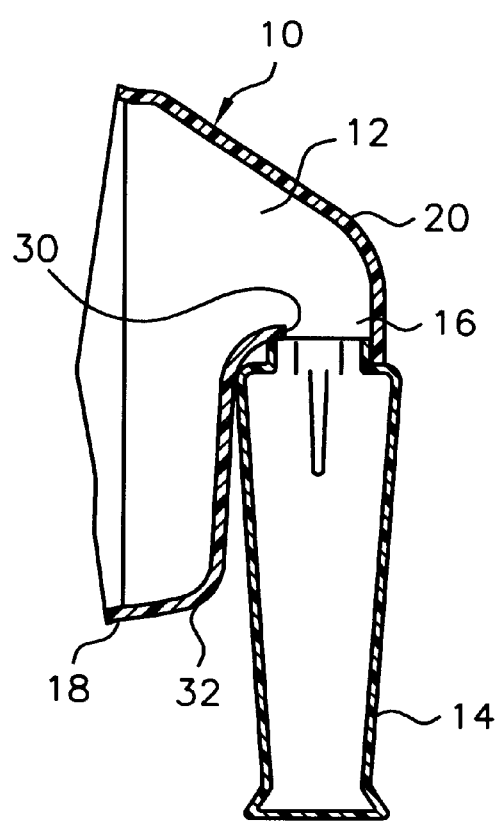
FIG. 5 is a cross sectional view of the face cover and noise maker taken on line 4—4 of FIG. 1.

Upper nose piece 20, round part 18 and sides 24 and 26 are flexible and can be folded inward and tucked in as shown in FIG. 4. A button 22 on each of face mask sides 24,26 can be provided with flexible rubber type strap 28 pressed onto buttons 22 thereby holding the face mask in a folded or closed position for storage between uses. A longer flexible strap 34 can be attached to buttons 22 so noise simulating system. 10 may be held onto the head of a person covering their nose and mouth at all times. The noise simulating system prevents the noise of a cough, sneeze or other human noises made by a rapid exhalation that would otherwise startle wild animals, birds and the like, by producing a natural sound of the environment such as a crow or other animal.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A noise simulating device adapted to be worn in an environment accustomed to certain familiar sounds comprising a face mask to cover the nose, mouth and sealed to the surrounding portions of the face of a person providing an air chamber between the face of said person and said face mask;

an opening in said face mask communicating from inside to outside thereof;

a noise maker in said opening;

said noise maker being adapted to produce a noise familiar to said environment whereby air pressure in said air chamber will exhaust through said noise maker to produce said noise familiar to said environment.

2. The device recited in claim 1 wherein said noise maker has means to make an animal sound.

3. The device recited in claim 1 wherein said noise maker has means to make the sound of a bird.

4. The device recited in claim 1 wherein said noise maker is a crow call.

5. The device recited in claim 1 wherein said noise maker has means to cover the nose and mouth of said person;

said covering means having a sealing means to seal said covering means to said person's face.

6. The device recited in claim 1 wherein said face mask is made from a flexible thermoplastic or rubber material.

7. The device recited in claim 1 wherein said face mask is adapted to attach to each end of a flexible strap;

said flexible strap being adapted to wrap around said person's head thereby holding said face mask in a sealed position against said person's face.

8. In combination, a face mask and an air vent;

said air vent having a noise maker;

said noise maker having means to be actuated by air from a person wearing said face mask to produce a natural sound of the environment.

9. The combination recited in claim 8 wherein said natural sound is a call of a bird.

10. The combination recited in claim 9 wherein said natural sound is a call of a crow and has means to make a sound familiar to a forest environment.

11. The combination recited in claim 8 wherein said face mask provides an air space between said face of said person and said face mask;

said noise maker having means to be actuated by a sneeze, cough or forceful exhalation of said person;

said noise being of the type natural to the environment.

12. A method to avoid startling wild creatures by providing a noise maker having means to be actuated by an inadvertent breath, sneeze, cough or forceful exhalation from a person.

13. The method of claim 12 comprising the steps of:

providing a face mask;

sealing said face mask to said person's face and covering said person's nose and mouth;

directing air into said face mask and through said noise maker to provide a noise familiar to said wild creatures when said person sneezes, coughs or exhales forcefully.

14. The method of claim 12 further comprising the steps of providing a face mask with an opening therein;

said noise maker in said opening;

said noise maker having means to be actuated by a wave of air from the wearer of said face mask to provide a sound simulating a noise natural to the area.

\* \* \* \* \*